United States Patent [19]
Downton et al.

[11] Patent Number: 5,260,086
[45] Date of Patent: Nov. 9, 1993

[54] FRESH-LIKE STORAGE-STABLE PULP AND IMPROVED JUICE PRODUCT AND PROCESS

[75] Inventors: Galen E. Downton, Erlanger, Ky.; Christa M. Fischer, Kronberg; John R. Hislop, Koenigstein, both of Fed. Rep. of Germany; Michael W. Maxwell, Bellevue, Ky.

[73] Assignee: The Procter & Gamble Company, Cincinnati, Ohio

[21] Appl. No.: 883,756

[22] Filed: May 15, 1992

[51] Int. Cl.⁵ ................................ A23L 2/06
[52] U.S. Cl. .................... 426/599; 426/590
[58] Field of Search ................. 426/599, 590

[56] References Cited

U.S. PATENT DOCUMENTS

| | | | |
|---|---|---|---|
| 2,325,360 | 7/1943 | Ayers et al. | 99/155 |
| 2,509,904 | 5/1950 | Bruce | 99/155 |
| 2,510,679 | 6/1950 | Bruce | 99/155 |
| 2,858,221 | 10/1958 | Laurie | 99/105 |
| 3,246,993 | 4/1966 | Webster et al. | 99/193 |
| 3,370,527 | 2/1968 | Holbrook | 100/147 |
| 3,657,424 | 4/1972 | Atkins et al. | 424/153 |
| 4,244,981 | 1/1981 | Blake | 426/567 |
| 4,254,157 | 3/1981 | Hannan | 426/616 |
| 4,266,472 | 5/1981 | Reale | 426/599 |
| 4,294,861 | 10/1981 | Ifuku et al. | 426/475 |
| 4,374,865 | 2/1983 | Strobel | 426/599 |
| 4,463,025 | 7/1984 | Strobel | 426/599 |
| 4,518,621 | 5/1985 | Alexander | 426/495 |
| 4,534,991 | 8/1985 | Kryger | 426/592 |
| 4,547,384 | 10/1985 | Kryger | 426/548 |
| 4,560,572 | 12/1985 | Watanabe | 426/616 |
| 4,665,816 | 5/1987 | Waters et al. | 100/38 |
| 4,690,827 | 9/1987 | Kupper et al. | 426/548 |
| 4,818,555 | 4/1989 | Piotrowski | 426/599 |
| 4,823,988 | 4/1989 | Raque et al. | 222/148 |
| 4,828,865 | 5/1989 | Kohlstette | 426/599 |
| 4,886,574 | 12/1989 | Grant | 426/599 |
| 4,889,739 | 12/1989 | Powers | 426/599 |
| 4,938,985 | 7/1990 | Swaine | 426/599 |
| 4,942,051 | 7/1990 | Sardisco | 426/489 |
| 4,946,702 | 8/1990 | Stipp et al. | 426/599 |
| 5,073,397 | 12/1991 | Tarr | 426/599 |
| 5,108,774 | 4/1992 | Mills | 426/599 |
| 5,162,128 | 11/1992 | Mills | 426/592 |

FOREIGN PATENT DOCUMENTS

| | | |
|---|---|---|
| 0296144 | 12/1988 | European Pat. Off. . |
| 0357130 | 3/1990 | European Pat. Off. . |
| 2526274 | 11/1983 | France . |
| 2616045 | 12/1988 | France . |
| 3133-658 | 11/1978 | Japan . |
| 3230-059-A | 9/1988 | Japan . |

OTHER PUBLICATIONS

Nagy et al., "Citrus Science and Technology", vol. 2, pp. 196–199 and 463 (1977), AVI Publishing Co., Westport, Conn.

"Aseptic System Builds New Markets at Home and Abroad", *Food Review*, Mar. 1984, pp. 31 and 33.

Gray, "The Production of Fresh Orange Juice", Fussiges Obst, Jg. 56, pp. 15–16 and 19–20 (Jan. 1989).

(List continued on next page.)

*Primary Examiner*—Carolyn Paden
*Attorney, Agent, or Firm*—Gary M. Sutter; Ronald L. Hemingway

[57] ABSTRACT

A process for making aseptic citrus sensible pulp involves the steps of: (a) extracting and finishing citrus juice containing sensible pulp to produce a pulp/juice slurry containing 30% to 50% pulp and 50% to 70% juice; (b) sterilizing the pulp/juice slurry by heating it at a temperature above 190° F. (88° C.) for at least 30 seconds; (c) further finishing the pulp/juice slurry in a finisher which maintains aseptic conditions to produce an aseptic pulp product containing 80% to 100% pulp and up to 20% juice; and (d) packaging the pulp product under aseptic conditions. An aseptic citrus sensible pulp product comprises 80% to 100% citrus sensible pulp and up to 20% citrus juice, where the sensible pulp is aseptic, has a pectin methylesterase activity not more than 1.0 P.E.U., and has an average size 10% to 25% larger than conventional pulp, and where at least 90% of the sensible pulp is broken juice sacs. A citrus juice comprises 93% to 97.5% citrus juice with a viscosity not more than 5.5 centipoise and 2.5% to 7% of the aseptic sensible pulp. The lower juice viscosity results from lower sinking pulp levels and/or a high shear process.

20 Claims, 5 Drawing Sheets

OTHER PUBLICATIONS

Szemplenski, "Equipment and Systems Used to Aseptically Process Food . . . ", The Food Processors Institute, pp. 35-43 (1983).

Carracher, "Aseptic Packaging", The Campden Food Preservation Research Association, pp. 4-7 (1983).

Robe, "Aseptic Fruits with Chunks in 1-50 Gallon Bag-in-Box/Drum Eliminate Freezing and Thawing", *Food Processing*, pp. 88-89 (Jan. 1985).

"Aseptic Processing System Handles Juices, Purees, Particulates, etc.", *Food Engineering*, vol. 59, No. 1, pp. 122-123 (Jan. 1987).

Mar. to Apr. 1990, in Germany, an in-home use test was placed with 600 households of an orange juice containing 4% aseptic pulp or 5% aseptic pulp (by weight of juice product), the pulp being a preferred aseptic pulp according to the present invention. The new pulp was not specifically pointed out to the test participants. The households were volunteers, and they did not sign confidentiality agreements.

Oct. to Nov., 1991, in Germany, an in-home use test was placed with 100 households of an orange juice containing 3.3% preferred aseptic pulp according to the present invention. The households were volunteers, and they did not sign confidentiality agreements.

Mitchell, "A Review of Aseptic Processing", *Advances in Food Research*, vol. 32, pp. 1-37 (1988).

Moshonas and Shaw, "Flavor Evaluation and Volatile Flavor Constituents of . . . ", *Journal of Food Science*, vol. 54, No. 1, pp. 82-85 (1989).

Marcy et al., "Effect of Storage Temperature on the Stability of . . . " *Journal of Food Science*, vol. 54, No. 1, pp. 227-230 (1989).

Boyd, "Aseptic Packaging", published by Continental Can Company, Inc., Chicago, Ill., pp. iv, 6-8 and 12 (1971).

Gan Shmuel Canning Factory, Israel, Data Sheets for "Orange Cells" and Grapefruit Cells. The Orange Cells product was purchased and found to be a slurry of about 50% juice and about 50% pulp.

"Capitalizing on Aseptic", Proceedings of National Food Processors . . . , The Food Processors Institute, pp. 9-11, 15, 21-22, 31-34 and 68 (1983).

Skala, "Aseptic Storage of Fruit Juices, Pulps and Purees", *Prumysl Potravin* 26 (4) 232 (1975) (Abstract).

Bobrakov et al., "Modification of Equipment for the Aseptic Stabilization . . . ", *Pishchevaya Promyshlennost* No. 1, 49-52 (1972) (Abstract).

"Sterile Canning of Fruit Juices by Continuous Flow Process", *Industrielle Obst und Gemuseverwertung* 63 (15) 408-410 (1978) (Abstract).

Mannheim, "Factors Affecting the Taste, Quality and Appearance of Aseptically Packed Citrus Juices", *Aseptipak '85* (1985) (Abstract).

Loo, "Prolongation of Conservation of Fruit Juices", *Revue de la Conserve Alimentation Moderne*, No. 59, 79-81 (1977) (Abstract).

"Symposium. Progress in the Field of Fruit and Vegetable Juices", Scientific-Technical Commission 16 (1980) (Abstract).

"Proceedings of the Third International Conference and Exhibition on Aseptic Packaging", *Aseptipak '85* (1985) (Abstract).

Szczesniak et al., "The Meaning of Textural Characteristics . . . ", *Journal of Texture Studies*, vol. 19, No. 1, pp. 61-78 (1988).

Johnson "Citrus Pulp Recovery", *The Citrus Industry*, vol. 68, No. 8, pp. 36-39 (1987).

Chan et al., "Aseptically Packaged Papaya and Guava Puree . . . ", *J. Food Science*, vol. 47, No. 4, pp. 1164-1169, 1174 (1982).

Chan et al., "Effects of Deaeration and Storage Temperature . . . ", *J. Food Science*, vol. 51, No. 1, pp. 165-168, 171 (1986).

Bernard et al., "Validation of Aseptic Processing . . . ", *Food Technology*, pp. 119-122, Dec. 1990.

Matthews, "Aseptic Bulk Handling of Citrus Juices . . . ", *Transactions of the 1989 Citrus Engineering Conf.*, pp. 36-45.

Anon., "Aseptic System Builds New Markets . . . ", *Food Review* 11(1), pp. 31, 33 (1984) (Abstract).

"Juicells-New Form of Canned Grapefruit", *Food Industries*, pp. 101-103 (Jan., 1947).

Nagy et al., Citrus Nutrition and Quality, ACS Symposium Series 143 pp. 153-154 (1980).

"Novel Texture Modification Using Natural Citrus Cell Sacs," *Prepared Foods*, p. 188, (May 1984).

"Whole Cell Fruit Drinks . . . ", Beverage Industry, Nov. 1985, p. 121.

Braddock, "Utilization of Citrus Juice Vesicle . . . ", *Food Technology*, vol. 37, No. 12, pp. 85-87 (Dec. 1983).

Koo et al., "Storage Trial of Tentatively Thermal--processed Orange Sac," *Korean Journal of Food Science and Technology*, vol. 16, No. 3, pp. 341-347 (1984).

Fig. 5

FRESH-LIKE STORAGE-STABLE PULP AND IMPROVED JUICE PRODUCT AND PROCESS

TECHNICAL FIELD

This invention relates to citrus pulp and juice products, and to processes for making these products.

The textural structure of a standard commercially manufactured citrus juice is determined by: 1) the viscosity provided by the juice or juice concentrate source, 2) the presence or absence of sinking pulp, and 3) the particle size and quality of added sensible pulp. Differences in these characteristics lead to mouthfeel properties in a commercially manufactured citrus juice that are different from fresh-squeezed citrus juice texture.

Sensible pulp in fresh-squeezed citrus juice is generally large and described as "soft, crunchy, and more like fresh-squeezed". In a conventional commercial process, this pulp is removed from juice, pasteurized, finished (juice removed), and frozen for storage. Before use, the pulp is chopped and thawed. Freezing the pulp stabilizes it so that it can be produced during a small part of the year, and added back to juice products throughout the year. However, this conventional processing causes a size reduction in the pulp of at least about 20% and a character change to "fibrous and mushy" and "tough and chewy".

The change of fresh pulp from large-sized and crunchy to small-sized and mushy/fibrous has been found to be largely a result of the freezing/chopping/thawing procedure used with conventionally processed pulp. The structure change is due to damage of cell membranes by formation of ice crystals during freezing and mechanical ripping during chopping. Therefore, finding a way to exclude or reduce the proportion of frozen pulp would provide a commercial citrus juice that has a mouthfeel (texture) more like fresh-squeezed juice.

By careful fruit selection and by extraction and finisher modifications it would be possible to start with larger sensible pulp, but the pulp, even though it started larger, would still be damaged by the subsequent freezing/chopping/thawing procedure.

Fresh-squeezed juice texture has also been found to differ from conventionally processed commercial juice texture in having a lower juice serum viscosity at equal sinking pulp level, and a higher percentage of large sensible pulp particles (>2.8 mm for orange pulp).

In addition, it has been found that fresh juice contains few whole juice-containing pulp sacs. Commercial juice products containing whole juice-containing pulp sacs (alone or blended) have an uncharacteristic mouthfeel - the whole pulp is perceived as being large, but also as unpleasantly fibrous.

It has been discovered that there is an optimized balance between juice serum viscosity and pulp size and structure that is important to gain consumer preferred texture perception. Large fresh sensible pulp added to conventional commercial juice serum does not match the mouthfeel of fresh-squeezed juice. Neither is fresh-squeezed juice texture matched by conventional commercial sensible pulp added to fresh-squeezed juice serum.

In short, there is a need for improvements in the textural properties of commercially processed citrus juices to make them more like fresh-squeezed juice.

Therefore, it is an object of the present invention to provide commercially manufactured citrus juice and pulp products that have a texture more like the fresh-squeezed products.

It is another object of the present invention to provide this texture benefit by the use of a manufacturing process that eliminates the need for the freezing/chopping/thawing steps used in a conventional process.

It is a further object of the present invention to provide this benefit by the use of an aseptic process for making citrus pulp and citrus pulp/juice slurry.

These and other objects of the present invention will be described in more detail hereinbelow.

SUMMARY OF THE INVENTION

This invention relates to aseptic citrus sensible pulp and improved citrus juice products containing the pulp. The pulp and juice products have a texture more like fresh-squeezed when compared with conventional commercial citrus products. The process for making aseptic citrus sensible pulp involves the steps of: (a) extracting and finishing citrus juice containing sensible pulp to produce a pulp/juice slurry containing from about 30% to about 50% by weight sensible pulp and from about 50% to about 70% by weight juice; then (b) sterilizing the pulp/juice slurry by heating it at a temperature above about 190° F. (88° C.) for a time of at least about 30 seconds; then (c) further finishing the pulp/juice slurry in a finisher which maintains aseptic conditions to produce an aseptic pulp product containing from about 80% to 100% by weight sensible pulp and up to about 20% by weight juice; and then (d) packaging the pulp product under aseptic, preferably low oxygen conditions.

An aseptic citrus sensible pulp product according to the invention comprises from about 80% to 100% by weight citrus sensible pulp and up to about 20% by weight citrus juice, wherein the sensible pulp is aseptic, wherein the sensible pulp has a pectin methylesterase activity of not more than about 1.0 P.E.U., wherein the sensible pulp has an average size between about 10% and about 25% larger than the size of conventional sensible pulp, and wherein at least about 90% by weight of the sensible pulp consists of broken juice sacs.

An improved single-strength citrus juice according to the invention comprises from about 93% to about 97.5% by weight citrus juice which has a viscosity of not more than about 5.5 centipoise when measured at 8° C. (46.4° F.) and at 11.8° Brix, and from about 2.5% to about 7% by weight aseptic citrus sensible pulp. The lower viscosity juice is obtained by reducing the level of sinking pulp and/or by subjecting the juice or juice concentrate to a particular high shear process. The combination of aseptic sensible pulp with lower viscosity juice provides the benefit of emphasizing the aseptic sensible pulp's crunchy and less mushy character.

DETAILED DESCRIPTION OF THE INVENTION

The present development provides improved citrus sensible pulp and improved citrus juice products containing the pulp that have a texture more like fresh-squeezed pulp and juice.

To summarize, the improved texture citrus juice products of the present invention contain three elements:

1. aseptic sensible pulp added to obtain the size, texture, and level impression of the sensible pulp in fresh-squeezed juice,
2. homogenized juice and/or lower sinking pulp levels to obtain a lower juice viscosity more like that of fresh-squeezed juice, and
3. in a preferred orange juice of the invention, a particular flavor and aroma system added to the juice that complements the desired textural characteristics described above.

Definitions

By "aseptic", as used herein, is meant sterile. By "sterile", as used herein, is meant commercially sterile or free of organisms capable of growing in or spoiling the citrus products of the invention. For reference, see *Compendium of Methods for the Microbiological Examination of Foods*, edited by M. L. Speck, American Public Health Association, Washington, D.C. (1984). By "aseptic processing", as used herein, is meant sterilization and the maintenance of a sterile state during processing. Sterilization of the citrus pulp or slurry of the invention is done by exposure to a temperature above about 190° F. (88° C.) for a time of at least about 30 seconds. By "aseptic packaging" or "packaging under aseptic conditions", as used herein, is meant the filling of the sterile product into a presterilized container and then closing the container in a sterile environment to obtain a hermetic seal.

As used herein, the term "sinking pulp" (also called "background pulp") refers to the finer size pulp present in citrus juice which passes through a Tyler 20 mesh screen. Sinking pulp usually results from the shredding or cutting of the juice sacs and membrane segments during processing. By contrast, "sensible pulp" refers to pulp which is retained on a Tyler 20 mesh screen and which is tactilely sensed by the tongue as particles. For purposes of the present invention, this definition of "sinking pulp" and "sensible pulp" will apply to all types of citrus fruit.

Juice Extraction

The aseptic sensible pulp and pulp/juice slurry of the present invention can be obtained from any of the different kinds of citrus fruits (e.g., oranges, grapefruits, lemons, or limes). Different finisher screen sizes can be used in each case. Since aseptic pulp is the closest reproduction of fresh-squeezed juice pulp size, distribution and strength, the starting pulp characteristics are important, particularly variety and maturity. Generally mid or late Valencia oranges are preferred sources of pulp.

Juice containing sensible pulp is extracted from the citrus fruit by use of a commercial juice extractor. Preferably the fruit is gently extracted to provide extracted juice having about 0.005% to about 0.040% by volume titratable peel oil, more preferably about 0.005% to about 0.015% by volume titratable peel oil. (These percentages of titratable peel oil are on an "as consumed basis"; the percentage of titratable peel oil in the juice "as made" is higher than the percentage "as consumed" because peel oil is often absorbed by the container.)

Reamer-type juice extractors are preferred for use in the present invention. See Nagy et al., *Citrus Science and Technology*, Vol. 2, (1977), pp. 192-93. Examples of suitable reamer-type juice extractors include the Brown Models 400 and 700 (manufactured by Brown International) and the Bertuzzi Model R-16 (manufactured by Bertuzzi Company). See also U.S. Pat. No. 3,858,500 to Rohm et al., issued Jan. 7, 1975, and U.S. Pat. 4,421,021 to Holbrook, issued Dec. 20, 1983, for other examples of reamer-type juice extractors. Other suitable extracters include "rotating disc-type" extractors and "reciprocating cup-type" extractors which are described in Nagy et al., supra, at pp. 190-191 and 194-195. Suitable rotating disc-type juice extractors include the Brown Model 1100. Examples of suitable reciprocating cup-type juice extractors include the FMC Model 291, the FMC Model 391, the FMC Model 491 and the FMC Model Low Oil Juice machines. If necessary to provide a titratable peel oil content within the preferred range, the citrus fruit can be de-oiled prior to juice extraction, for example by using a pricking device such as a Brown Oil Extractor.

Process for Aseptic Sensible Pulp

In the present invention, citrus pulp is processed aseptically so that it does not need to be frozen. To summarize, after citrus juice extraction, rag, seed and peel materials are separated from the extracted juice by a primary finisher. Then a sensible pulp/juice slurry is separated from the main juice stream with a secondary finisher. This slurry is sterilized after which it is packed aseptically or separated into sterile pulp and juice streams by a final finisher. The final finisher has been modified to maintain sensible pulp sterility. After aseptic packing, the pulp or pulp slurry can be stored above freezing temperatures until needed for product formulation. This eliminates the need for the conventional steps of freezing, chopping and thawing which lead to pulp size reduction and texture degradation. The resulting sensible pulp is larger and has a texture (mouthfeel) more like fresh-squeezed pulp, inasmuch as its texture is soft and crunchy instead of tough, mushy and chewy. The average pulp size and size distribution of the aseptic pulp is more like fresh-squeezed than conventional frozen pulp. Processing and storage costs are reduced by elimination of processing steps and by storage above freezing temperatures.

The following table illustrates differences between the pulp and juice of fresh squeezed orange juice, conventional commercial orange juice, and an orange juice of the present invention:

|  | Fresh Squeezed Juice | Juice of Present Invention | Conventional Commercial Juice |
| --- | --- | --- | --- |
| Single Strength Viscosity (cP) | 2-3 | 2-5 | 6-9 |
| Pulp Pectin Methylesterase Activity (P.E.U.) | ≧1.5 | ≦0.5 | ≦0.5 |

-continued

| | Fresh Squeezed Juice | Juice of Present Invention | Conventional Commercial Juice |
|---|---|---|---|
| Average Pulp Size (mm) | ≧2.2 | ≧2.2 | ≦2.2 |

It is seen from the table that the viscosity of the juice of the invention is lower than that of conventional commercial juice, and more like the viscosity of fresh squeezed juice. The aseptic pulp of the present invention has a low pectin methylesterase (enzyme) activity which indicates processing and differentiates it from fresh squeezed pulp. The average size of the aseptic sensible orange pulp of the invention is at least about 2.2 millimeters (it will vary depending on the variety, maturity and quality of the starting fruit). The size is more like that of fresh squeezed juice pulp, and it will be from about 10% to about 25% larger than the size of conventional (frozen/chopped/thawed) sensible pulp from the same fruit.

Following is a more detailed description of the process for making pulp and juice products of the present invention. The juice which has been extracted as described above is partially finished by removing non-juice materials. As used herein, the term "non-juice materials" refers to any rag, seed or peel materials present in the extracted juice. These non-juice materials, which are relatively large in size, are essentially the waste product of juice extraction. When a reamer-type or rotating disc-type juice extractor is used, partial finishing of the extracted juice requires the use of a primary finisher. Preferred primary finishers include a Brown Model #2500 finisher having a screen size of 0.125 inch (0.3175 cm). Vibrating screen primary finishers can also be used.

After non-juice materials have been removed, a sensible pulp/juice slurry is separated from the main juice stream by use of a secondary finisher. The secondary finisher separates enough juice so that the pulp/juice slurry contains from about 30% to about 50% by weight sensible pulp and from about 50% to about 70% by weight citrus juice. Preferably the pulp/juice slurry will contain from about 40% to about 50% by weight sensible pulp and from about 50% to about 60% by weight juice. (The percentage of "juice" in the slurry and pulp products includes the juice serum, sinking pulp, and any other juice components that are not sensible pulp.) The secondary finisher can be the same equipment or similar to the primary finisher. Preferred for use as the secondary finisher is a Brown Model #2500 finisher having a screen size of 0.020 inch (0.0508 cm). As understood by persons skilled in the art, a smaller screen size of the finisher will be used to accomplish juice separation versus non-juice materials separation.

Next, the pulp/juice slurry is sterilized by heating it at a temperature above about 190° F. (88° C.) for a time of at least about 30 seconds. Preferably the sterilization time is between about 30 seconds and about 120 seconds to avoid the possibility of thermal degradation of the slurry, and most preferably between about 30 seconds and about 70 seconds. The preferred sterilizer is a Spirotech Monochannel Model #SM4.5. The sterile pulp/juice slurry can then be aseptically packaged or further processed to make aseptic pulp as described below.

After pulp/juice slurry sterilization, aseptic sensible pulp is then separated from residual juice in a final finisher which maintains aseptic conditions. The finisher can be any suitable screw-type or paddle-type juice finisher, or a vibrating screen, where the finisher has been modified to operate aseptically. These modifications include: (1) a sterile interior, for example by improved cleaning design, elimination of "blind holes" and other pulp build-up areas, sterile seals, and a sanitary screen; (2) a positive interior pressure provided by sterile inert gas or air of between about 5 psig (0.35 kg/cm$^2$) and about 40 psig (2.81 kg/cm$^2$), preferably between about 5 psig (0.35 kg/cm$^2$) and about 25 psig (1.76 kg/cm$^2$), more preferably between about 12 psig (0.84 kg/cm$^2$) and about 18 psig (1.27 kg/cm$^2$) (preferably an inert gas such as nitrogen is used, air is less preferred); and (3) a totally enclosed, tightly sealed processing system, for example by the use of tighter cover seals. Examples of suitable screw-type finishers which can be modified to operate aseptically include the Brown Model 2503 (preferred with 0.020 inch [0.0508 cm] screen) and Model 3600 screw finishers, FMC Model 35 screw finishers, and FMC Model UCF 200 "close tolerance" finishers. Examples of suitable paddle-type finishers which can be modified include the Brown Model 200 paddle finisher. See Nagy et al., supra, at pp. 196-199. After removal of the residual juice in the aseptic finisher, the aseptic sensible pulp product contains from about 80% to 100% by weight sensible pulp and up to about 20% by weight juice (has a quick fiber value between about 165 and about 200), preferably from about 90% to 100% by weight sensible pulp and up to about 10% by weight juice (quick fiber value between about 165 and about 185).

The aseptic pulp/juice slurry or the aseptic sensible pulp are packaged under aseptic conditions by use of any commercially available aseptic packaging machine. Such machines range from 1 gallon (3.785 liters) up to 300 gallons (1135.5 liters) in size. Preferred is a Scholle Model 10-2 aseptic packaging machine which has a 55-gallon (208.2 liter) size. It is also preferred to aseptically package the sterile pulp/juice slurry or aseptic pulp under low oxygen conditions, i.e., where the level of oxygen is not more than about 7 ppm at 70° F. (21° C.), preferably not more than about 5 ppm at 70° F. (21° C.). Minimizing oxygen will help to prevent off-flavor formation or browning of the aseptic products. The amount of oxygen remaining in the headspace of the package can be minimized by deaeration and/or adding an inert gas such as nitrogen. Bags which have an aluminized layer to minimize oxygen penetration are also preferred.

After aseptic packaging, the aseptic pulp or pulp/juice slurry is stored above freezing temperature (32° F., 0° C.), but is preferably refrigerated at a temperature below 40° F. (4.4° C.). The products can also be stored at room temperature, but this is less preferred because aging is more rapid.

Aseptic Sensible Pulp and Pulp/Juice Slurry Products

An aseptic citrus sensible pulp/juice slurry product according to the present invention comprises from about 30% to about 50% by weight citrus sensible pulp and from about 50% to about 70% by weight citrus juice, preferably from about 40% to about 50% by weight citrus sensible pulp and from about 50% to about 60% by weight citrus juice. An aseptic citrus sensible pulp product according to this invention comprises from about 80% to 100% by weight citrus sensible pulp and up to about 20% by weight citrus juice, preferably from about 90% to 100% by weight citrus sensible pulp and up to about 10% by weight citrus juice.

The sensible pulp and the pulp/juice slurry are aseptic, i.e., commercially sterile or free of organisms capable of growing in or spoiling these citrus products. As described above, the aseptic sensible pulp and pulp-/juice slurry products can be stored above freezing temperatures because they will not spoil, which eliminates the need for the conventional freezing/chopping/thawing steps which result in pulp size reduction and texture degradation. Processing and storage costs are reduced. The sensible pulp of this invention has a soft and crunchy texture more like that of fresh-squeezed pulp.

The sensible pulp and pulp/juice slurry products have a pectin methylesterase activity of not more than about 1.0 P.E.U., preferably not more than about 0.5 P.E.U. The method of measuring pectin methylesterase activity is described in part II of the Analytical Methods section herein. The low pectin methylesterase activity of these products indicates that they have been processed to the extent where most of this pectin methylesterase enzyme has been de-activated. In particular, heat during processing de-activates the enzyme. The products of this invention have a low pectin methylesterase activity similar to that of other commercially processed citrus products, and different from that of fresh-squeezed citrus products which do not undergo processing (particularly heating) steps. A low pectin methylesterase activity is beneficial because high levels of pectin enzymes make pectin insoluble. This can lead to juice separation into two distinct phases, one clear and the other cloudy.

The average size of aseptic citrus sensible pulp of the present invention is between about 10% and about 25% larger than the size of conventional sensible pulp. This is because the aseptic sensible pulp is not subjected to the freezing/chopping/thawing process used on conventional pulp which results in ripping and size reduction of the pulp. Preferably the average size of the aseptic pulp is between about 15% and about 25% larger than conventional pulp. The average size of orange pulp of this invention is at least about 2.2 millimeters, and preferably between about 2.2 millimeters and about 3.2 millimeters. This contrasts with an average size between about 2.0 millimeters and about 2.4 millimeters for conventional orange pulp. Grapefruit pulp made according to this invention has an average size of at least about 3.6 millimeters, and preferably between about 3.6 millimeters and about 5.4 millimeters. In contrast, conventional grapefruit pulp has an average size between about 3.3 millimeters and about 4.3 millimeters. The method for measuring average pulp size is described in part III of the Analytical Methods section. The large-sized citrus sensible pulp of this invention is more like fresh-squeezed pulp and therefore provides a preferred texture to juice products made from the pulp.

At least about 90% by weight of the aseptic citrus sensible pulp of this invention consists of broken juice sacs, preferably at least about 95% by weight. The percentage of broken sacs is determined by visual inspection, typically by use of a microscope on low resolution. As discussed above, juice products containing a large amount of whole juice-containing pulp sacs have an uncharacteristic mouthfeel, the whole pulp being perceived as large but also unpleasantly fibrous. The aseptic sensible pulp of this invention is more like fresh-squeezed juice in that it contains few whole juice-containing pulp sacs.

The aseptic citrus sensible pulp can be derived from any citrus fruit(s) but preferably the citrus fruit is selected from the group consisting of oranges and grapefruits, and most preferably oranges.

Juice Process and Products

A process for making an improved single-strength citrus juice according to the present invention comprises the steps of: (a) providing citrus juice having a viscosity of not more than about 5.5 centipoise when measured at 8° C. (46.4° F.) and at 11.8° Brix, and (b) combining this low viscosity citrus juice with the aseptic sensible pulp of the invention, in amounts so that the single-strength citrus juice contains from about 93% to about 97.5% by weight citrus juice and from about 2.5% to about 7% by weight sensible pulp.

It has been found that the viscosity of the citrus juice, in a juice product containing the aseptic sensible pulp of the present invention, influences the perceived texture of the aseptic sensible pulp. The combination of aseptic sensible pulp with lower viscosity juice and preferably a lower level of sinking pulp emphasizes the aseptic sensible pulp's crunchy and less mushy character.

The citrus juice for use in the single-strength juice product can be that which has been separated from the pulp by the above-described finishing steps. If desired, the juice can be first concentrated by a well-known process such as evaporative concentration or freeze concentration. A preferred evaporative concentration method uses a thermally accelerated short time evaporator (TASTE). A preferred freeze concentration method is disclosed in U.S. Pat. No. 4,374,865 to Strobel, issued Feb. 22, 1983, incorporated by reference herein.

Of course, the juice used to make the single-strength juice product of the present invention does not have to be the same juice that was separated from the pulp—it can be from another source. Not from concentrate pasteurized juice is a preferred juice to which aseptic pulp can be added.

The citrus juice for use in the present invention has a viscosity of about 5.5 centipoise or less, preferably about 5 centipoise or less, when measured at 8° C. (46.4° F.) and at a juice solids content of 11.8° Brix. (The method for measuring the viscosity is described at column 16, line 66, to column 17, line 19 of U.S. Pat. No. 4,946,702 to Stipp et al.) This lower viscosity juice is characteristic of freshly-squeezed citrus juice.

The low viscosity citrus juice can be obtained by reducing the measured level of sinking pulp to between about 3 to about 7 volume percent, for example by centrifuging the juice serum to remove sinking pulp. (The method for measuring the sinking pulp level is described at column 18, lines 13-31 of the Stipp et al. patent.)

Preferably, however, the lowered juice viscosity is obtained by subjecting between about 30% and 100% by weight of the juice or the juice concentrate to a high shear treatment disclosed in U.S. Pat. No. 4,946,702 to Stipp et al., issued Aug. 7, 1990 (incorporated by reference herein). Preferably between about 70% and 100% by weight of the juice or juice concentrate is subjected to this high shear treatment, and most preferably 100%.

The high shear treatment described in the Stipp et al. patent can be used on single-strength citrus juice to reduce its viscosity, but it is about 25% more effective in lowering the viscosity of concentrated citrus juice. Therefore, it is sometimes preferred to use the high shear treatment on concentrates, and then reconstitute the concentrates with water to single strength. The concentrates can be standard 3 to 1 concentrates as well as the more concentrated 4 to 1 or 5 to 1 concentrates.

The citrus juice or juice concentrate which has been subjected to the high shear treatment has the required low viscosity of about 5.5 centipoise or less, preferably about 5 centipoise or less, when measured at 8° C. (46.4° F.) and at a juice solids content of 11.8° Brix. The high shear treatment generally lowers the viscosity of the juice or juice concentrate by at least about 0.5 centipoise, preferably by from about 1.5 centipoise to about 5 centipoise, when measured at 8° C. (46.4° F.) and 11.8° Brix.

The high shear treatment acts on the single strength or concentrated juice by shredding and disintegrating the sinking pulp particles, especially the larger size particles. Usually, high shear treatment refers to methods of treatment having shear rates (calculated) of at least about 300,000 sec.$^{-1}$, and preferably from about 2,000,000 to about 8,000,000 sec.$^{-1}$. (The method for calculating shear rates is described at column 18, line 32 to column 19, line 24 of the Stipp et al. patent.) A preferred high shear treatment method is to homogenize the single strength or concentrated citrus juice under high pressure. Suitable high pressure homogenizers useful in carrying out the high shear treatment are disclosed in the Stipp et al. patent.

The high shear treatment generally reduces the mean particle size of the sinking pulp by at least about 40 microns, preferably between about 50 microns and about 200 microns, so that the mean particle size of the sinking pulp is usually about 125 microns or less. (The method for measuring the mean sinking pulp particle size is described at column 17, lines 34–59 of the Stipp et al. patent.)

Orange juice products of the present invention preferably contain a particular flavor system that complements the desired textural characteristics described above, and that approaches the flavor and aroma characteristics of fresh-squeezed juice. This flavor system is disclosed in published European Patent Application No. 0357130 of Hislop et al., published Mar. 7, 1990. Flavor and aroma components, and orange oil (if needed), are added to the orange juice or orange concentrate so as to obtain a finished product with a titratable peel oil level of less than about 0.015% by volume as consumed, and a volume ratio of the combined amount of acetaldehyde, ethyl butyrate, ethyl 3-hydroxyhexanoate, octanal and valencene, to the combined amount of alpha-pinene, myrcene, linalool, 4-terpineol, alpha-terpineol and nootkatone of at least 1.2 to 1, preferably at least 2 to 1, most preferably at least about 2.5 to 1. The methods for measuring these flavor and aroma components and the titratable peel oil are described in parts IV and V of the Analytical Methods section herein.

It is desirable to minimize the level of titratable peel oil present in the finished product. The level of titratable oil in the finished product as consumed should be about 0.015% by volume or less, preferably about 0.010% by volume or less. The level of titratable oil will in fact correspond to the level of limonene, the principal constituent of orange oil. The level of oil should be kept low because at high levels limonene and other orange flavor compounds present in orange oil tend to be bitter or burning in character, and the terpene (limonene) compounds can be oxidized or thermally degraded to less desirable orange flavor compounds.

The importance of minimized titratable peel oil content on the orange aroma and flavor quality of the finished product is particularly shown by a ratio based on the level of more desirable orange compounds, relative to the level of less desirable orange compounds. For the purposes of the present invention, the level of more desirable orange compounds is based on the combined amount of acetaldehyde, ethyl 3-hydroxyhexanoate, ethyl butyrate, octanal and valencene. Acetaldehyde, ethyl 3-hydroxyhexanoate, and ethyl butyrate are highly volatile compounds which contribute to the "freshness" of the juice. Octanal and valencene are less volatile compounds which contribute desirable "orangey" flavor character to the juice. For the purposes of the present invention, the level of less desirable orange compounds is based on the combined amount of alpha-pinene, myrcene, linalool, 4-terpineol, alpha-terpineol and nootkatone. These less desirable compounds represent components obtained from the peel portion of the fruit obtained during squeezing, as well as undesirable degradation products. For the purpose of the present invention, the volume ratio between the level of above more desirable components and the level of above less desirable components, should be at least 1.2:1.

A certain amount of substantially terpene-free orange oil can be added to the orange juice or concentrate to make sure that the level of degradation products derived from limonene is kept within the limits set hereinabove, while the level of desirable components present in orange oil is boosted. The level of added terpene-free oil can be from 3 ppm to 15 ppm by volume of the finished product. Depending on the amount of titratable oil in the orange juice or concentrate, and in the pulp, a quantity of regular orange oil (not deterpenated) can be added, in an amount of from 0.001% to 0.015% by volume of the finished product. When regular orange oil is added to the concentrate source, the level of added terpene-free oil should be such that the volume ratio between the level of terpene-free oil and the level of added regular orange oil is in the range from 1 to 0.7 to 1 to 73, preferably from 1 to 3 to 1 to 43.

In order to obtain the ratio of more desirable to less desirable aroma and flavor components, it is also necessary to add to the orange concentrate or juice, a flavor/aroma essence, which is selected from the group of acetaldehyde, nonanal, octanal, decanal, ethyl-butyrate, ethyl-3-hydroxyhexanoate, and valencene. Preferred in the present invention is a flavor component consisting mainly of acetaldehyde as a 5% solution in ethanol; the level of added flavor/aroma component is in the range from 0.0001% to 0.0009% by volume of the finished product.

In addition to the individual flavor/aroma essences mentioned hereinabove, it may be desirable to use other sources of aroma/flavor materials. For example, commercial orange essences such as Florex 50041 (20:1 ethyl butyrate to hexanal ratio) and 56010, made by Florex Flavors Ltd. of Eaton Park, Fla. (subsequently purchased by Redd Citrus Specialties Division of Hercules), and Natural Orange Aroma (#070570), Natural Orange Aroma Plus (#375002U), and Enriched Orange 3 Fold Essence Oil (#375212U), made by Redd Citrus Specialties of Safety Harbor, Fla., and commercial orange oils such as Florex 5801R, Citriff Orange

15980267, made by International Flavors and Fragrances, Inc. of New York City, N.Y., Valencene 85-90% purity (Citrus & Allied), made by Citrus & Allied Essences, Ltd. of Floral Park, N.Y., and cold pressed orange oils, can be used to supply at least a portion of the aroma/flavor materials for orange juice products of the present invention. Non-orange sources of natural flavorings such as Orange with Other Natural Flavors #15980828, made by International Flavors and Fragrances, Inc., and Natural Citrus Enhancer, Orange type #D8118 made by Fries & Fries, Inc. of Cincinnati, Ohio, can also be used as a source of aroma/flavor materials.

ANALYTICAL METHODS

I. Method for Measuring the Percentages of Sensible Pulp and Juice

For purposes of the present invention, the weight percentage of sensible pulp in a juice/pulp mixture is the weight of pulp which is retained on a Tyler 20 mesh screen divided by the total weight of the juice/pulp mixture. The sensible pulp is weighed after it is free of excess juice or free juice as described hereinbelow in the description of the "Ball Test".

A. Sensible Pulp "Wetness" Measurement (Ball Test)

1) Reference

In-house analytical method no. 12-19.

2) Principle

To measure the amount of pulp (weight) in a pulp/juice mixture which is too large to pass through a Tyler 20 mesh screen (i.e., the amount of "sensible" pulp).

3) Equipment

Strainer which has a hemispherical Tyler 20 mesh screen of woven stainless steel wire 0.015" (0.038 cm) in diameter and containing 20 openings per square inch (per 6.452 cm$^2$) of screen, the size of each of the openings being 0.033" (0.0841 mm).

4) Procedure a. Use a test sample of 10 grams of sensible pulp or pulp/juice slurry.

b. Pour the test weight of pulp or pulp/juice slurry through the Tyler 20 mesh screen in the test strainer.

c. Shake by hand until the pulp retained on the screen "balls up" and is free of excess juice.

d. Dry the bottom of the screen by patting on a paper towel (or sponge). Tap the screen on the paper towel until the pulp forms into a "ball" and the screen does not retain any more moisture.

e. Weigh "balled up" pulp using tared weighing dish and record the weight in grams.

f. Divide the weight of the pulp by 10 grams to give you the weight percentage of pulp in the sample. (For example, 9 grams of sensible pulp in a 10 gram pulp/juice sample equals 90% sensible pulp (and 10% juice). This can also be reported as a "wetness" value of 0.9. As other examples, 80% pulp would equal a "wetness" value of 0.8, and 70% pulp would equal a "wetness" value of 0.7.)

B. Sensible Pulp Dryness Measurement (Quick Fiber Method)

1) Reference

FMC Manual: Procedures for Analysis of Citrus Products, pp. 46-49, September (1983).

2) Description

Sensible pulp dryness (quick fiber) is determined by adding 200 ml water to 200 g of a pulp/juice mixture, mixing, separating liquid with shaker screen and measuring volume of liquid separated.

3) Use

The quick fiber value is a measure of the ratio of dry sensible pulp to juice in a mixture of sensible pulp and juice (the higher the quick fiber measurement, the lower the ratio of dry sensible pulp to juice).

4) Equipment

Mechanical shaker screen with Tyler 20 mesh screen
Quart plastic container
Balance, platform type
250 ml graduated cylinder
Stopwatch
Aluminum pan—18.4 cm×28.6 cm×3.5 cm 5) Procedure a. Mix sensible pulp/juice sample thoroughly and add 200 g of the sample to tared quart container.

b. Add 200 ml water, mix thoroughly with spatula during 5 minute period, pour onto a Tyler 20 mesh shaker screen.

c. Drain for ½ minute into aluminum pan, shake 1 minute, allow to drain ½ minute. Wipe material from bottom of screen into pan.

d. Pour liquid from pan into 250 ml graduated cylinder, and record volume in ml as the "quick fiber" value of the sensible pulp. For a comparison, 100% by weight sensible pulp as measured for the present claims ("Ball Test", described hereinabove) is equal to a quick fiber value of 165, 90% sensible pulp equals quick fiber of 185, and 80% sensible pulp equals quick fiber of 200.

II. Pectin Methylesterase Activity Test

1) Reference

"Citrus Science and Technology", Nagy, et al., Vol. 2, 1977, AVI Publishing Company, Inc. Westport, Conn., pp. 511-512.

2) Scope

The purpose of the pectin methylesterase activity test is to determine the activity of the enzyme pectin methylesterase in juice, pulp, or pulp/juice slurry, measured in units of P.E.U.

3) Principle

A sample of the juice, pulp, or pulp/juice slurry being tested is added to a pectin-sodium chloride salt solution. This mixture is then brought to a pH of 7.5 with sodium hydroxide. If enzyme activity is present, the pH will start to drop. A dilute solution of sodium hydroxide (0.02 N) is then slowly added to keep the pH at 7.5. The amount of 0.02 N sodium hydroxide used as well as the time of reaction are used to calculate the amount of pectin methylesterase present in the sample.

4) Apparatus pH meter
Water bath
Bath controller - circulator
Waring blender
Variable auto transformer
Variable speed magnetic stirrer
Teflon stirring rods
Stop watch
Beakers—250 ml.
Volumetric flask—1 liter
Volumetric flask—500 ml.

5) Reagents

Pectin N.F. (California Exchange Pure Citrus Pectin)
Sodium Chloride, Reagent Grade
Sodium Hydroxide 0.02 N
Sodium Hydroxide 0.10 N
Sodium Hydroxide 1.00 N
Buffer solutions pH 4 & pH 7

6) Standard Solution Preparation—2M Sodium Chloride Stock Solution a. Place one molecular weight of reagent grade sodium chloride (58.45 g) in a 500 ml. volumetric flask.
b. Add distilled water to the 500 ml. mark.
c. Shake until completely dissolved.

1% Pectin—Salt Solution a. Place 75 ml. of the 2M sodium chloride solution in a one liter volumetric flask.
b. Fill to mark with distilled water.
c. Fill blender jar approximately ¾ full with the solution.
d. Using variable transformer, run blender at approximately 40% setting.
e. Slowly sift in 10±0.1 g pure citrus pectin.
f. Add the remainder of the salt solution and blend approximately one minute.
g. Place in liter bottle and store in refrigerator at 40° F. There are no storage time limitations on this reagent.

7) Analysis of Juice Samples a. Place 100 ml pectin-sodium chloride salt solution in 250 ml. beaker.
b. Bring to 35° C.±1° C. in water bath.
c. Pipet 10 ml . 11.8° Brix juice sample into 10 ml pectin-salt solution that was brought to 35° C. (Step 1 & 2).
d. Place magnetic stirrer in solution, insert pH meter electrodes and stir slowly.
e. Add 1.0 N sodium hydroxide to bring the pH to approximately 6.0.
f. Then add 0.10 N sodium hydroxide to carry pH just barely over 7.5, e.g., 7.6.
g. When pH returns to exactly 7.5 add 0.2 N sodium hydroxide for 10 minutes at a rate that will hold pH as near 7.5 as possible.
h. The mls. of 0.02 N sodium hydroxide used during the ten-minute period are then used in the following calculation to determine the pectin methylesterase activity in the juice, measured in units of P.E.U.

8) Analysis of Sensible Pulp or Pulp/Juice Slurry Samples a. Weigh out 10.0±0.10 grams of sensible pulp or pulp/juice slurry.
b. Follow steps a, b, d, e, f and g as for juice samples.
c. Determine °brix of residual juice contained in pulp.

9) Calculations a. Juice $$\text{P.E.U.} \times \frac{10^4}{°\text{brix}} = \frac{\text{ml of alkali} \times \text{N of alkali}}{°\text{brix} \times \text{ml sample} \times \text{time in minutes}} \times 10^4$$

For example, a 10 ml sample of 11.8° brix single strength juice requires 25 ml 0.02 N NaOH to maintain pH of 7.5 for 10 minutes.

$$\text{P.E.U.} \times \frac{10^4}{°\text{brix}} = \frac{25 \times 0.02}{11.8 \times 10 \times 10} \times 10^4 = 4.23$$

b. Sensible Pulp or Pulp/Juice Slurry $$\text{P.E.U.} \times \frac{10^4}{°\text{brix}} = \frac{\text{ml of alkali} \times \text{N of alkali}}{°\text{brix of juice} \times \text{grams of sensible pulp} \times \text{time in minutes}} \times 10^4$$

For example, a 10 gram sample of sensible pulp containing juice having 11.8° brix required 100 ml of 0.02 N NaOH to maintain pH of 7.5 for 10 minutes.

$$\text{P.E.U.} \times \frac{10^4}{°\text{brix}} = \frac{100 \times 0.02}{11.8 \times 10 \times 10} \times 10^4 = 16.95$$

(As understood by persons skilled in the art, P.E.U. units are conventionally given as $$\text{"P.E.U."} \times \frac{10^4}{°\text{brix}}\text{"}$$

so that the values are whole numbers, but then shortened to "P.E.U.")

III. Sieve Pulp Sizing Method (Average Particle Size of Sensible Pulp)

1) Reference

In-house analytical method no. 12-12.

2) Principle

The average particle size of citrus sensible pulp can be determined by running a certain amount of the pulp sample through a series of stainless steel sieves, of which the hole sizes are noted. The sieve opening which 50% of the sensible pulp weight is associated with (accumulative) is considered to be the average diameter of the sensible pulp in the sample.

3) Apparatus a. Light metal distributing funnel with top I.D. of at least 8" (20.3 cm) and a bottom I.D. of approximately ⅞" (2.2 cm), adapted with a 13/16" (2.06 cm) O.D. plastic insert of 9/32" (0.71 cm) I.D.
b. Duro super glue.
c. Hard plastic hose—13" (33 cm) long, ¼" (0.635 cm) O.D. and ⅛" (0.3175 cm) I.D.
d. Top adapter—distribution. (A 9⅝" (24.4 cm)×2" (5.08 cm)×¼" (0.635 cm) plastic bar with a centered plastic cylinder insert of ⅝" (1.59 cm) O.D. and 9/32" (0.71 cm) I.D.)

e. Ring stand welded or affixed to a Ro-Tap portable shaker about 13" (33 cm) above top sieve brace bar.

f. Stainless 3" (7.62 cm) Tyler sieve screens (mesh sizes 5, 7, 10, 12, 14, 16, 18, & 20).

g. Receiving pan ordered from Tyler Combustion Engineering (Model #8409) and adapted with a ½" (1.27 cm) O.D. outlet on bottom.

h. 3 ft. (91.4 cm) long ½" (1.27 cm) I.D. Tygon tubing to bucket (at least 3 foot [91.4 cm]).

i. A plastic 5 gallon (18.9 liter) bucket.

j Bottom adapter, purchased from Tyler Combustion Eng. Co., Mentor, Ohio. It is an 8" (20.32 cm) to 3" (7.62 cm) adaptor (Model #R20001 for RX-24 shaker).

k. A 400 ml beaker.

l. 1 gallon (3.8 liter) plastic pitcher with narrow lip.

m. Steel spatula for stirring.

n. A balance accurate to 0.1 grams.

o. Small thistle brush.

p. Portable table about 20" high.

q. Computer and software capable of performing average particle diameter calculations.

r. Ample supply of paper towels.

s. 2000 ml. graduated cylinder and squirt bottle.

t. Ro-Tap Portable Shaker (RX-24) from Tyler Combustion Engineering Co.

4) Procedure for Measuring Sensible Pulp Size a. Weigh 25.0 g of the citrus sensible pulp sample into the plastic pitcher, and add 1400 mls of tap water by graduated cylinder.

b. Stir thoroughly with spatula, using a tap water squirt bottle to rinse any excess pulp, clinging to spatula, into the plastic pitcher.

c. Weigh and record tare weights while screens are dry.

d. Typically use the Tyler No. 5, 7, 12 and 20 mesh screens for the citrus sensible pulp. (Note: To determine which sieve screens to use if analyzing different products: Do a trial run using Tyler No. 5, 7, 12, 16, 20 mesh screens. After weighing screens, if there is between 7 grams and 18 grams on a screen, definitely keep those screens in the stack. If there is less than 7 grams on a screen, discard it. If there is more than 18 grams on a screen, an additional screen is needed just above the overloaded screen. Always use between 4 and 6 mesh screens in a stack, beginning with a No. 5 or 7 mesh screen, and ending with a No. 20 mesh.) (As well known by persons skilled in the art, Tyler screens have the following sieve openings:

| Tyler Mesh | Sieve Opening |
|---|---|
| No. 5 | 4 mm |
| No. 6 | 3.36 mm |
| No. 7 | 2.83 mm |
| No. 8 | 2.38 mm |
| No. 9 | 2.00 mm |
| No. 10 | 1.68 mm |
| No. 12 | 1.41 mm |
| No. 14 | 1.19 mm |
| No. 16 | 1.00 mm |
| No. 20 | 0.841 mm | e. Wet stack of appropriate screens under faucet.

f. Place screens on shaker in ascending order from the top.

g. Set shaker timer so that at least 5 minutes of shaking will take place after the sample is initially poured and touches the funnel.

h. Pour sample through the funnel, maintaining continuous flow.

i. After pouring, rinse plastic pitcher and funnel with a total of 300±25 mls. of tap water.

j. When shaking stops, remove the screens and set on paper towels (side-by-side) for 2 minutes for drainage purposes.

k. After 2 minutes use paper towels to remove any excess moisture from bottom outsides of individual screens (don't touch screen holes).

l. After drying, weigh each screen and record.

m. Rinse screens thoroughly for the next run.

5) Calculating Average Particle Size

Following is a brief explanation of the calculation for average particle size:

a. The cumulative net weight % is calculated for each screen starting with the largest size (#5 or #7 mesh). Note that the cumulative net weight on the #20 mesh screen will always be 100%.

b. Linear regression is then applied to the common log of the cumulative net weight % (x axis) vs. the common log of the screen size (y axis). The regression line is calculated using data from all but the #20 mesh screen.

c. If the cumulative net weight % is less than or equal to 50% then the equation $x = \log$ (cumulative net weight %) is used. If the cumulative net weight % is greater than 50% then the equation $x = 2 * \log (50) - \log (100 - \text{cumulative weight \%})$ is used.

d. Then the value of y at log (50) on the x axis is determined by the equation $y = mx + b$.

e. Finally, the antilog of the value of y is the average particle size of the citrus sensible pulp.

EXAMPLE

| SCREEN # | GROSS SCREEN WGT | DRY SCREEN WGT | NET WGT |
|---|---|---|---|
| 5 | 120 | 100 | 20 |
| 7 | 125 | 100 | 25 |
| 10 | 130 | 100 | 30 |
| 20 | 135 | 100 | 35 |

| NET CUM WGT | CUM WGT % | SCREEN # | SCREEN SIZE |
|---|---|---|---|
| 20 | 18.18 | 5 | 4 mm |
| 45 | 40.91 | 7 | 2.8 mm |
| 75 | 68.18 | 10 | 1.7 mm |
| 110 | 100 | | |

| LOG (SCREEN SIZE) | CUM WGT % | LOG (CUM WGT %) |
|---|---|---|
| 0.60 | 18.18 | 1.26 LOG(CUM WGT %) |
| 0.45 | 40.91 | 1.61 LOG(CUM WGT %) |
| 0.23 | 68.18 | 1.90 2LOG (50) − LOG(100 − LOG(CUM WGT %)) |

| X-AXIS | Y-AXIS |
|---|---|
| 1.26 | 0.60 |
| 1.61 | 0.45 |
| 1.90 | 0.23 |

VALUE OF Y AT LOG(50%) ON THE X-AXIS = 0.38
COMMON ANTILOG OF 0.38 = 2.41 (this is the average particle size).

IV. Analysis of Flavor and Aroma Components in Orange Juice and Orange Juice Concentrate The amounts of flavor and aroma components in the orange juice and orange juice concentrate products of the present invention are measured using the two analytical methods described in U.S. Pat. No. 4,973,485 to Rich, issued Nov. 27, 1990, at column 44, line 3 to column 46, line 54 (incorporated by reference herein). The "Purge and Trap Headspace Analysis" method at columns 44–45 is used to measure the amounts of acetaldehyde and ethyl butyrate. The "Tissue Homogenization Method" at columns 45–46 is used to measure the amounts of ethyl 3-hydroxyhexanoate, octanal, valencene, alpha-pinene, myrcene, linalool, 4-terpineol, alpha-terpineol and nootkatone. The only change is that the Durawax-3 capillary column described at column 44, lines 48–52, is replaced by a DB Wax capillary column. The DB Wax column contains chemically bonded Carbowax 20M. (The manufacturer, flow rates, temperatures, etc., are the same as for the Durawax-3 column.)

V. Titratable Orange Peel Oil Content (Scott Oil Method)

This method is based on the Scott Oil Method described in Nagy et al., Citrus Science and Technology, Vol. 2 (1977), pp. 506–508. In this method, orange peel oil is distilled from an 2-propanol solution of the juice sample and then titrated with a standard $KBr$-$KBrO_3$ solution in an acidic medium.

A 0.025 N $KBr$-$KBrO_3$ titrant solution is prepared by diluting 1 part of a 0.1 N $KBr$-$KBrO_3$ solution (from RICCA Chemical Company, Arlington, Tex., Catalog No. 1170), with 3 parts distilled water. An acidic indicator solution is also prepared by mixing together 5 ml. of a 0.1% methyl orange solution with 1000 ml of a dilute hydrochloric acid solution (2 parts distilled $H_2O$, 1 part HCl).

A standard Scott Peel Oil Distillation Apparatus is used in this method. This apparatus essentially consists of a flat bottom distillation flask, an inclined adaptor and a distillation condenser.

A blank titration value (TB) is obtained by titrating 3 separate mixtures containing 25 ml. of 2-propanol and 10 ml. of the acidic indicator solution with the titrant solution and then dividing the total ml. of titrant solution used by 3.

25 ml. of a well mixed orange juice sample is pipetted into the distillation flask containing boiling chips or beads, followed by the addition of 25 ml. of 2-propanol. The mixture in the distillation flask is then heated to a temperature of about 85° C. Distillate is collected until condensation of water vapor appears on the transfer tube (approximately 35 ml of distillate). To the distillate is then added 10 ml of the acidic indicator solution. While being stirred with a magnetic stirrer, the acidic distillate solution is titrated with titrant solution to a colorless endpoint. The volume of titrant solution required to reach the endpoint (TS) is recorded. The volume percent titratable orange oil for the sample is then obtained by the following calculation: % titratable orange peel oil = (TS-TB)×0.004.

EXAMPLE 1

Aseptic Pulp Slurry Process

Juice is extracted and finished to produce a pulp-/juice slurry with 30% by weight sensible pulp and 70% by weight juice. Specifically, the following steps are conducted to produce this pulp/juice slurry. Florida Valencia oranges are graded and washed. Next the oranges are sorted by size and fed to Brown Model #700 juice extractors (Brown International Corp., 633 N. Barranca Ave., Covina, Calif. 91723) operating at a rate of 1,500 boxes of fruit per hour. Juice, pulp, rag and seeds exit the juice extractors. Then the rag, seeds and other large defects are separated from the juice and pulp in a primary finisher (Brown Model #2500) having a screen size of 0.125 inch (0.3175 cm) and a pressure setting of about 90 psig (6.3 kg/cm$^2$). Very small seeds are removed in hydroclones. The juice and pulp are then pumped through a secondary finisher (Brown Model #2500, 0.020 inch (0.0508 cm) screen size, pressure setting of about 50–60 psig [3.5–4.2 kg/cm$^2$]), which removes a portion of the juice stream. The pulp-/juice slurry going into the secondary finisher contains about 1–4% by weight sensible pulp and 96–99% by weight juice, and coming out of the finisher it contains about 30% by weight sensible pulp and about 70% by weight juice. After the secondary finisher, the pulp-/juice slurry has a pectin methylesterase activity of 1.5 P.E.U.

Next the pulp/juice slurry is pumped through a Spirotech Monochannel Pasteurizer and Cooler (modified shell-and-tube heat exchanger) (Spirotech Corp., 29 Temple Drive, Thomastown, Victoria, 3074, Australia), where the slurry is sterilized by heating at 205° F. (96° C.) for about 60 seconds. In the cooler, the slurry is chilled to 45° F. (7° C.). The sterilized slurry has a pectin methylesterase activity of 0.4 P.E.U. The average size of the sensible pulp in this aseptic slurry is 2.7 Mm, and greater than about 95% by weight of the sensible pulp consists of broken juice sacs. The slurry then goes to a Scholle Auto-Fill 10-2 aseptic packaging system (Scholle Corp., 200 West North Ave., Northlake, Ill. 60164). This aseptic packaging system includes a filling machine designed to maintain sterility at the filler heads with high temperatures and an aseptic spray. The pulp/juice slurry is filled into sterilized 55-gallon (208.2 liter) plastic bags inside 55-gallon (208.2 liter) metal drums. The bags have an aluminized layer to minimize oxygen penetration, and they are filled with slurry in such a way as to minimize headspace oxygen. After the bags are filled and sealed, foam is used to fill the headspace in the drums. This prevents tears and stress fractures due to hydraulic motion during shipment. The drums are closed and stored refrigerated at 35° F. (2° C.).

When ready for use, the aseptic pulp/juice slurry is removed from the drums and added to a tank. Then the slurry is pumped to another tank where it is mixed together with a premix containing diluted orange concentrate (made primarily from Brazilian oranges) and flavorants. 30% by weight of the orange concentrate has been high pressure homogenized according to the process described in U.S. Pat. No. 4,946,702 to Stipp et al., specifically by processing the concentrate one time through an APV Gaulin homogenizer set at 5,000 psi. The flavorants are the following orange-derived aqueous essences and oils (by volume percent of the finished product): 0.009% regular orange oil and 0.0012% terpene-free Florida orange oil which were preblended together, 0.008% acetaldehyde as a 5% solution in ethanol (an equivalent amount of acetaldehyde could also be supplied by using 0.45% Redd Natural Orange Aroma), and 0.17% Natural Orange Aroma Plus #375002U by Redd Citrus Specialties. The volume ratio of the combined amount of acetaldehyde, ethyl butyrate, ethyl 3-hydroxyhexanoate, octanal and valencene; to the combined amount of alpha-pinene, myrcene, linalool, 4-terpineol, alpha-terpineol and nootkatone is 8.1. The titratable peel oil level is 0.021% by volume so that, upon package absorption, the final product contains 0.015% by volume titratable peel oil. The entire mixture is diluted with water to make a single-strength juice. After these ingredients have been well mixed, the juice is pumped to an ultra-high temperature sterilizer. The juice is sterilized by heating with culinary steam to 248° F. (120° C.) for 3 seconds, and then cooled to room temperature. The resulting single-strength product is 11.4° Brix. The juice has a viscosity of about 5.0 centipoise when measured at 8° C. and 11.8° Brix. Then the juice is packed aseptically with a commercial system into aseptic packages.

EXAMPLE 2

Finished Aseptic Pulp Process

Figure 1:
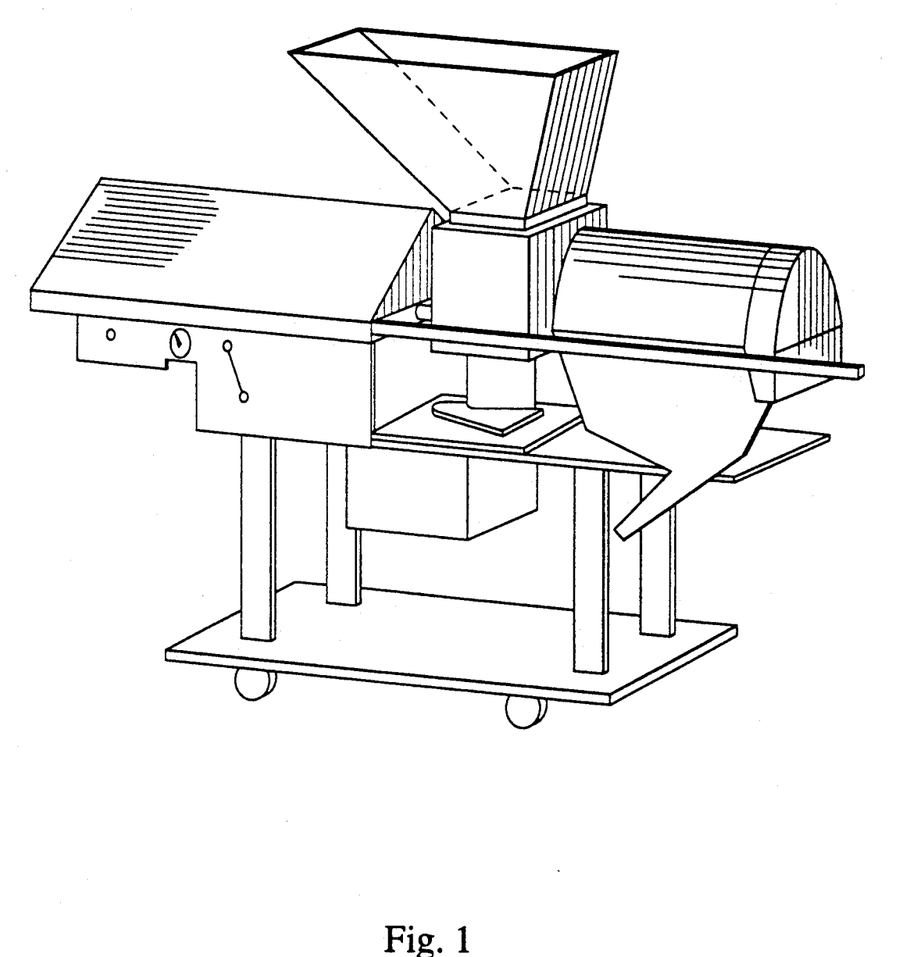
FIG. 1 is a drawing of a standard Brown Model #3600 Finisher before it is modified.
Figure 2A:
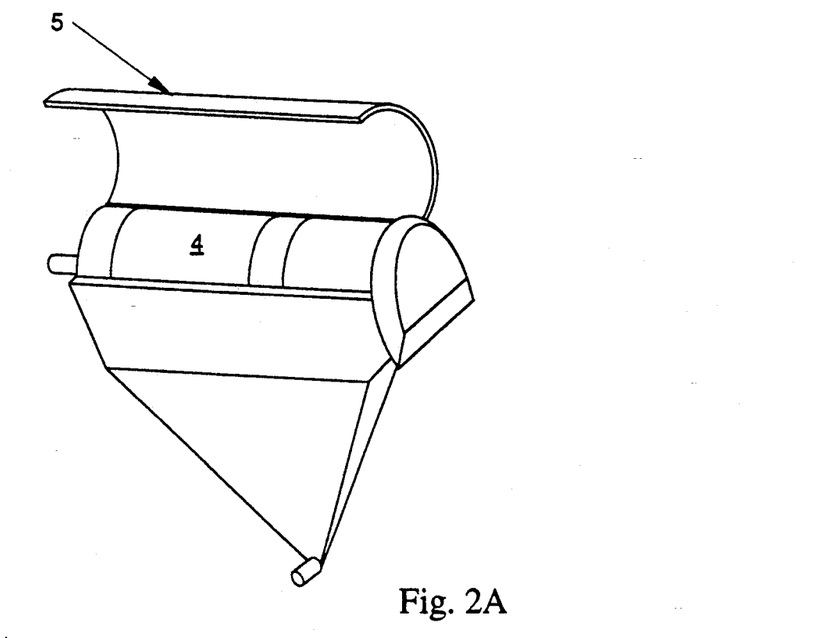
FIG. 2 shows more details of the standard Brown finisher including the inlet and outlet streams and a close-up view of the screen and its shield.
Figure 2B:
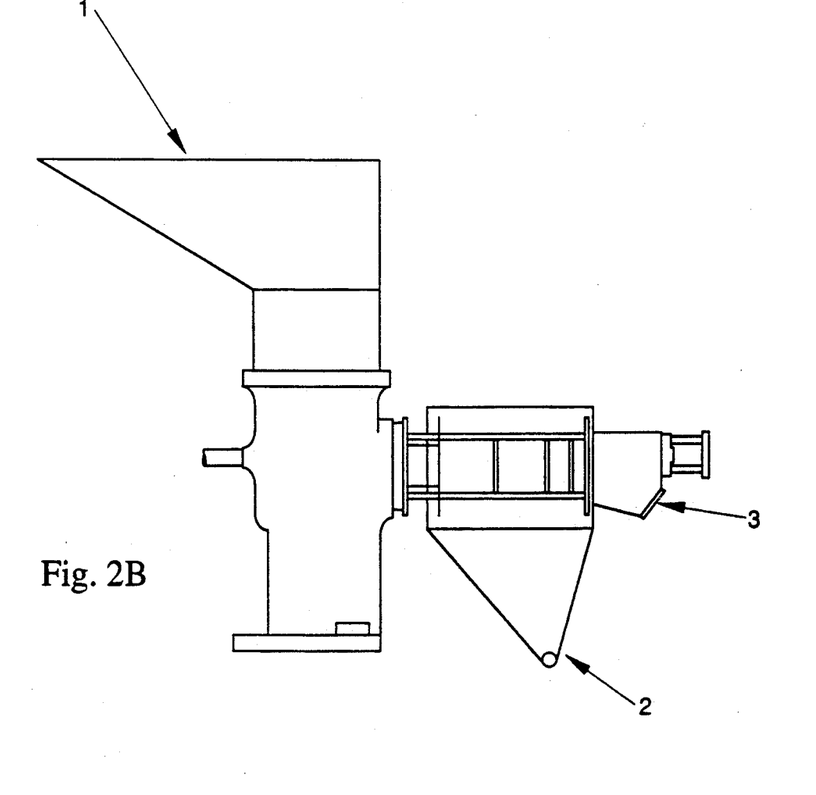
Figure 3A:
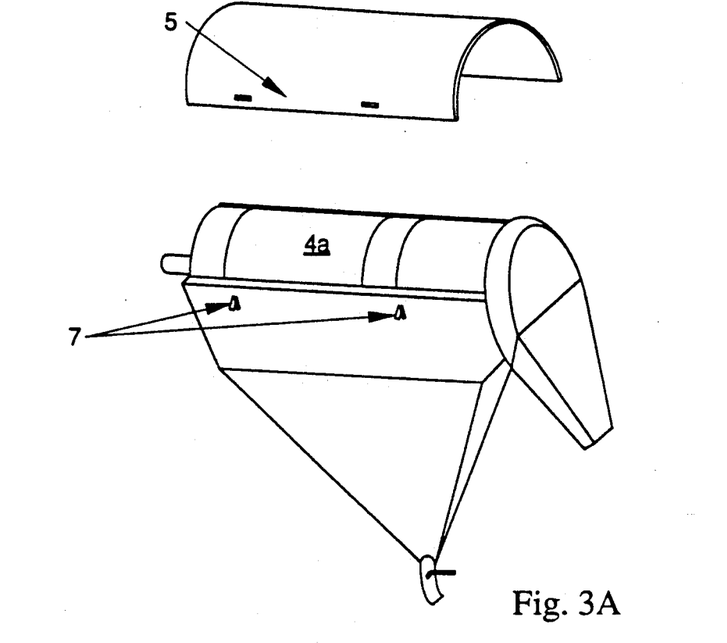
FIG. 3 shows the Brown finisher after it has been specially modified to continuously operate under aseptic conditions.
Figure 3B:
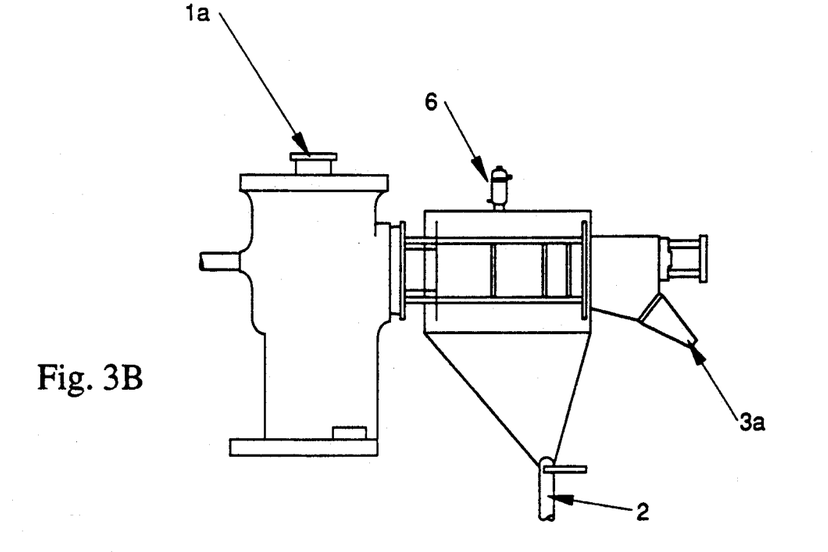

A sterilized pulp/juice slurry containing about 30% by weight pulp and about 70% by weight juice is made as described in Example 1. After sterilization but before filling, the slurry is further processed by pumping it through a final finisher (Brown Model #3600 Finisher, 0.020 inch (0.0508 cm) screen size, air pressure setting of 5–10 psig [0.35–0.7 kg/cm$^2$]) that has been specially modified to maintain the slurry under aseptic conditions. The finisher is totally enclosed and tightly sealed. This specially modified final finisher is shown schematically in the attached FIG. 3. FIG. 1 is a drawing of a standard Brown Model #3600 Finisher before it is modified. FIG. 2 shows more details of the standard Brown finisher including the hopper (1) used to receive the juice/pulp slurry, the juice discharge (2), the pulp discharge (3), and a close-up view of the screen (4) and its shield (5). FIG. 3 shows the Brown finisher after it has been specially modified to continuously operate under aseptic conditions. The hopper (1a) used to receive the juice is converted to a 1⅜ inch (3.49 cm) pipe with sanitary fitting. A 0.2 μm sterile air filter (6) is installed to maintain a slight positive air pressure inside of 1–2 psig (0.07–0.14 kg/cm$^2$). (It would be preferred to use nitrogen or another inert gas instead of air.) The shield (5) covering the screen (4a) is sealed by keeping the lid in place with clamps (7) and a food grade gasket. The pulp discharge (3a) is reduced to a 1⅜ inch (3.49 cm) diameter outlet with a sanitary fitting. Valves are installed to control the flow of juice and air during operation and the flow of water during the equipment sterilization. A special drilled screen (4a) is used for a cleaner design.

The specially modified final finisher separates residual juice from the pulp, so that the aseptic pulp product coming out of the finisher comprises about 100% by weight pulp (quick fiber level of about 165). The average pulp size is 2.3 mm, and greater than about 95% by weight of the pulp consists of broken juice sacs. The aseptic pulp product is packaged into aseptic containers and is kept refrigerated at 35° F. (2° C.) until ready for use.

This aseptic pulp is then added to a tank where it is mixed with some room temperature water to make it easier to pump. The pulp/water mix is pumped to another tank where it is mixed together with a premix containing orange concentrate and flavorants. All of the concentrate has been high pressure homogenized according to the process of the Stipp et al. patent by passing it once through an APV Gaulin homogenizer set at 5,000 psi. The flavorants are as described in Example 1; the volume ratio of the combined amount of acetaldehyde, ethyl butyrate, ethyl 3-hydroxyhexanoate, octanal and valencene; to the combined amount of alpha-pinene, myrcene, linalool, 4-terpineol, alpha-terpineol and nootkatone is 8.1. The titratable peel oil level is 0.021% by volume so that, upon package absorption, the final product contains 0.015% by volume titratable peel oil. The entire mixture is diluted with water to make a single-strength juice and then pumped to an ultra-high temperature sterilizer. The juice is sterilized by heating with culinary steam at 248° F. (120° C.) for 3 seconds, and then cooled to room temperature. The resulting single-strength product is 11.4° Brix, and it contains 6% by volume sinking (background) pulp. The juice has a viscosity of 3.0 centipoise when measured at 8° C. and 11.8° Brix. Then the juice is packed aseptically with a commercial system into aseptic packages.

EXAMPLE 3

Finished Aseptic Pulp Process

A sterilized pulp/juice slurry containing about 40% by weight pulp and about 60% by weight juice is made as described in Example 1 (except that more juice has been removed). After sterilization but before filling, the slurry is further processed by pumping it through a final finisher (Brown Model #2506 Finisher, 0.020 inch (0.0508 cm) screen size, pressure setting of 4–8 psig [0.28–0.58 kg/cm$^2$]) that has been specially modified to maintain the slurry under aseptic conditions. Modifications include a special washing system, sealed cover, enclosed inlets and outlets, drilled screen, internal polishing, and a 0.2 μm sterile air filter assembly to maintain a positive air pressure of 15–18 psig (1.05–1.27 kg/cm$^2$).

The specially modified finisher separates residual juice from the pulp, so that the aseptic sensible pulp product coming out of the finisher contains about 100% by weight pulp (quick fiber value of about 165). The pectin methylesterase activity of the aseptic pulp is 0.5 P.E.U. The average pulp size is 2.4 mm, and greater than about 95% by weight of the pulp consists of broken juice sacs. The pulp product is packaged aseptically into 55-gallon (208.2 liter) plastic bags inside 55-gallon (208.2 liter) metal drums by use of a Scholle aseptic packaging system as described in Example 1.

The aseptic pulp is then made into a single-strength juice and packed aseptically as described in the last paragraph of Example 2, hereinabove.

EXAMPLE 4

Texture Comparisons

(a) Conventional Pulp (Frozen)

A conventional pulp to use as a test control is processed as described in Example 1 before the sterilization step, producing a slurry of about 30% by weight pulp and about 70% by weight juice. Then, instead of being sterilized, the slurry is conventionally pasteurized by pumping it through a Spirotech Monochannel Pasteurizer at a temperature of about 185° F. (85° C.) for about 60 seconds. Then the pasteurized slurry is pumped through a standard (not aseptically modified) AMC Model #200 paddle finisher. The conventional sensible pulp product contains about 100% by weight pulp (about 165 quick fiber). The pulp is packaged by a conventional system into 5-gallon (18.9 liter) boxes or standard plastic bags in 55-gallon (208.2 liter) drums, then frozen. When ready for testing, the frozen pulp is placed into a tank with a 158° F. (70° C.) water jacket, separated into large pieces by chopping several times with rotating blades, water is added, and then stirred until thawed.

(b) Comparison of: (i) Aseptic Slurry, (ii) Conventional Pulp, and (iii) Commercial Orange Juice An aseptic pulp/juice slurry made as described in Example 1 is tested against a conventional pulp made as described in Example 4(a) above. For testing, the aseptic pulp/juice slurry is made into a single-strength juice as described in Example 1 (30% by weight of the concentrate is homogenized), and the conventional pulp is added to a commercial orange juice concentrate (not homogenized, made from primarily Brazilian oranges) and diluted with flavorants and water as described in Example 1 to make a single-strength juice. The juice made from the aseptic pulp/juice slurry is formulated to contain 4% by weight pulp, while the juice made from the conventional pulp is formulated to contain 3.3% by weight pulp to obtain the same pulp quantity impression for a different viscosity. The juice containing the aseptic pulp/juice slurry made with homogenized concentrate has a viscosity of 5 cP compared to the juice made with conventional pulp and concentrate which has a viscosity of 6 cP. The average sensible pulp size in the juice made from the aseptic pulp/juice slurry is 2.7 mm versus 2.3 mm for the juice made from the conventional pulp product. Lastly, a premium commercial orange juice containing about 3.3% by weight conventional pulp is also tested. The juice products are given to test panelists for consumption, and the following texture results are obtained:

| Percent/Percent Favorable/Unfavorable | Juice w/ 3.3% Conventional Pulp | Juice with 4% Aseptic Pulp | Premium Commercial Orange Juice |
|---|---|---|---|
| Unduplicated Texture Comments | 23/23 | 33/24 | 28/23 |
| Contains Pulp | 17/15 | 30/19 | 19/13 |

The juice with 4% by weight aseptic pulp has significantly improved texture compared to the juice containing the conventional pulp. The favorable texture comments are much higher and the pulp more noticeable.

The textural character of the juice with 3.3% by weight conventional pulp and the juice with 4% by weight aseptic pulp is measured by human perception in the form of descriptive panels. These panels work with self-developed descriptions and measure them on scales without any references (0=not at all present; 9=totally present). The important descriptions that are developed for pulp are "fibrous", "crunchy", "mushy", "fiber quantity", and "fiber firmness".

Figure 4:
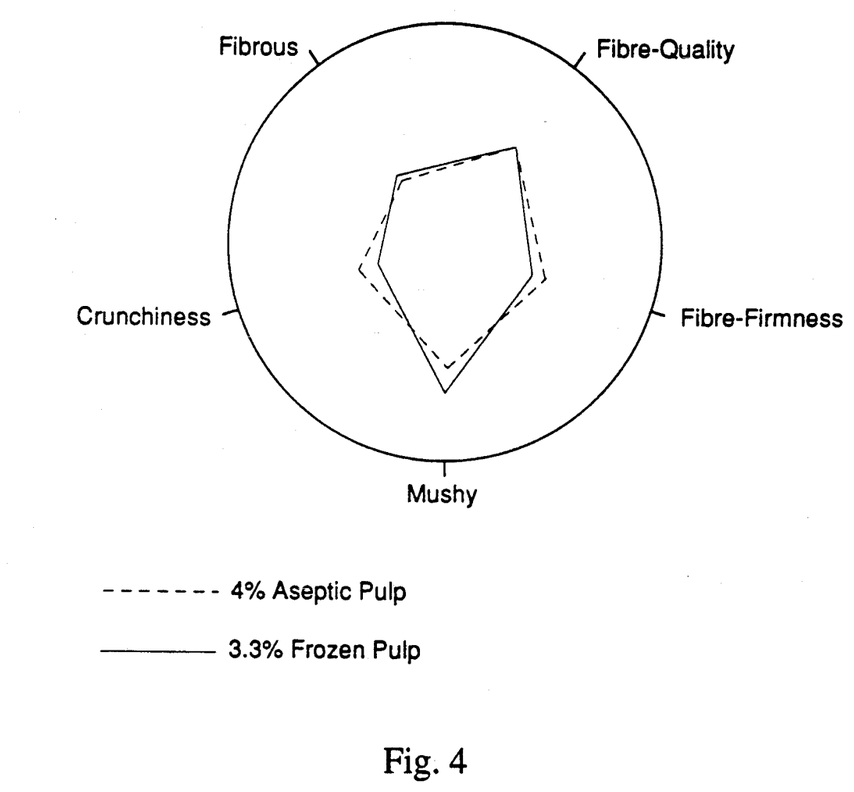
FIG. 4 is a graphic representation of descriptive panel data on orange juice made with aseptic pulp/juice slurry versus orange juice made with conventional pulp.

The results of descriptive panel data on these two orange juices are shown graphically in FIG. 4. It is seen that the juice made with 4.0% by weight aseptic pulp and homogenized concentrate has the better pulp texture: the pulp is perceived as being crunchier and firmer, and less mushy.

Figure 5:
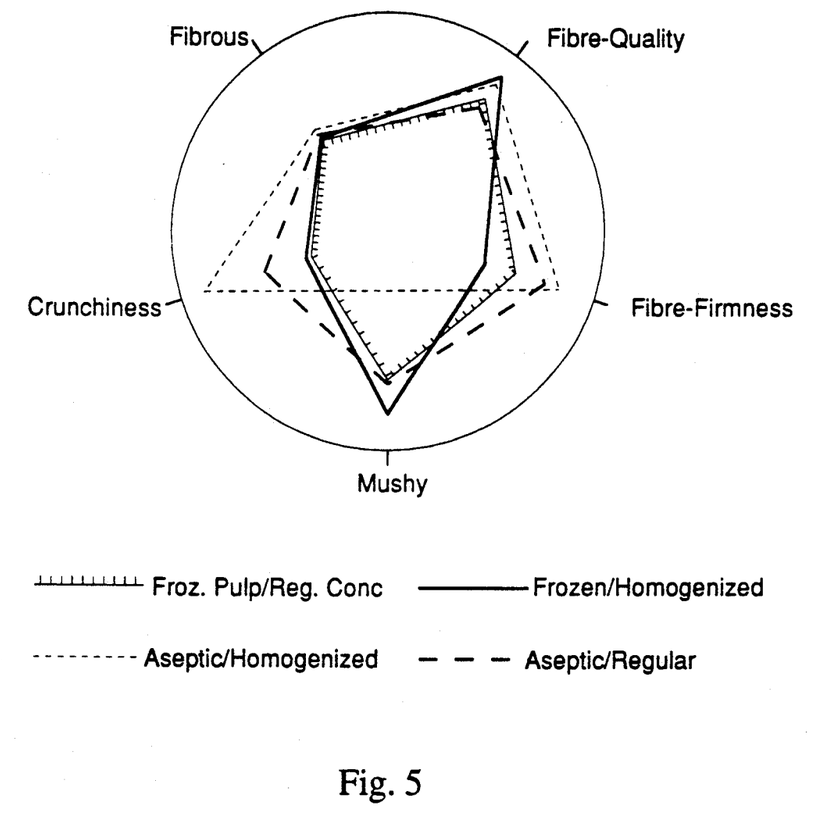
FIG. 5 is a graphic representation of descriptive panel data on orange juices made with: (i) aseptic pulp/homogenized concentrate, (ii) aseptic pulp/regular concentrate, (iii) conventional pulp/homogenized concentrate, and (iv) conventional pulp/regular concentrate.

(c) Comparison of: (i) Aseptic Pulp/Homogenized Concentrate, (ii) Aseptic Pulp/Regular Concentrate, (iii) Conventional Pulp/Homogenized Concentrate, (iv) Conventional Pulp/Regular Concentrate Four additional orange juice products are made and tested by descriptive panel. The first juice contains 3.4% by weight aseptic pulp (made as in Example 2) and orange juice concentrate 30% by weight of which has been homogenized according to the present invention. The second juice contains 3.4% by weight aseptic pulp (made as in Example 2) and regular concentrate (not homogenized). The third juice contains 3.4% by weight conventional pulp (made as described in Example 4(a) above) and concentrate 30% by weight of which has been homogenized, while the fourth juice contains 3.4% by weight conventional pulp (made as described in Example 4(a) above) and regular concentrate. The descriptive panel results are shown graphically in FIG. 5. It is seen that the juice made from aseptic pulp and homogenized concentrate contains pulp perceived as being crunchier, firmer, and less mushy.

What is claimed is:

1. A process for making an aseptic citrus sensible pulp/juice slurry comprising the steps of:
   extracting and removing juice from citrus juice containing sensible pulp to produce a pulp/juice slurry containing from about 30% to about 50% by weight sensible pulp and from about 50% to about 70% by weight juice; then
   (b) sterilizing the pulp/juice slurry by heating it at a temperature above about 190° F. (88° C.) for a time of at least about 30 seconds; and then
   (c) packaging the pulp/juice slurry under aseptic conditions.

2. A process for making aseptic citrus sensible pulp comprising the steps of:
   (a) extracting and removing juice from citrus juice containing sensible pulp to produce a pulp/juice slurry containing from about 30% to about 50% by weight sensible pulp and from about 50% to about 70% by weight juice; then
   (b) sterilizing the pulp/juice slurry by heating it at a temperature above about 190° F. (88° C.) for a time of at least about 30 seconds; then
   (c) further removing juice from the pulp/juice slurry in a finisher which maintains aseptic conditions to produce an aseptic pulp product containing from about 80% to 100% by weight sensible pulp and up to about 20% by weight juice; and then
   (d) packaging the pulp product under aseptic conditions.

3. A process according to claim 2 wherein the finisher which maintains aseptic conditions in step (c) has a sterile interior, has a positive interior pressure provided by sterile inert gas or air of between about 5 psig (0.35 kg/cm$^2$) and about 40 psig (2.81 kg/cm$^2$), and has a totally enclosed, tightly sealed processing system.

4. A process according to claim 2 wherein the aseptic pulp product of step (c) contains from about 90% to 100% by weight sensible pulp and up to about 10% by weight juice.

5. A process according to either of claims 1 or 2 wherein the pulp/juice slurry of step (a) contains from about 40% to about 50% by weight sensible pulp and from about 50% to about 60% by weight juice.

6. A process according to either of claims 1 or 2 wherein the packaging under aseptic conditions is also done under low oxygen conditions of not more than about 7 ppm oxygen at 70° F. (210° C.).

7. A process for making an improved single-strength citrus juice comprising the steps of:
(a) providing citrus juice having a viscosity of not more than about 5.5 centipoise when measured at 8° C. (45.4° F.) and at 11.8° Brix; and
(b) providing aseptic citrus sensible pulp made by a process comprising the steps of:
(i) extracting and removing juice from citrus juice containing sensible pulp to produce a pulp/juice slurry containing from about 30% to about 50% by weight sensible pulp and from about 50% to about 70% by weight juice; then
(ii) sterilizing the pulp/juice slurry by heating it at a temperature above about 190° F. (88° C.) for a time of at least about 30 seconds; then
(iii) further removing juice from the pulp/juice slurry in a finisher which maintains aseptic conditions to produce an aseptic pulp product containing from about 80% to 100% by weight sensible pulp and up to about 20% by weight juice; and then
(c) combining the citrus juice of step (a) with the aseptic sensible pump of step (b) in amounts so that the single-strength citrus juice contains from about 93% to about 97.5% by weight citrus juice and from about 2.5% to about 7% by weight sensible pulp.

8. A process according to claim 7 wherein the citrus juice of step (a) is provided by subjecting citrus juice or citrus juice concentrate to high shear treatment for a period of time sufficient to: (1) reduce the mean particle size of the sinking pulp by at least about 40 microns, and (2) lower the viscosity of the citrus juice or citrus juice concentrate by at least about 0.5 centipoise when measured at 8° C. (46.4° F.) and at 11.8° Brix.

9. A process according to any of claims 1, 2, or 7 wherein the citrus fruit is oranges.

10. A process according to claim 7 wherein the citrus juice is orange juice, and wherein citrus flavorants are added to the juice and pulp to obtain a finished product with a titratable peel oil level of less than about 0.015% by volume as consumed; and a volume ratio of the combined amount of acetaldehyde, ethyl butyrate, ethyl 3-hydroxyhexanoate, octanal and valencene, to the combined amount of alpha-pinene, myrcene, linalool, 4-terpineol, alpha-terpineol and nootkatone of at least 1.2 to 1.

11. An aseptic citrus sensible pulp/juice slurry product comprising from about 30% to about 50% by weight citrus sensible pulp and from about 50% to about 70% by weight citrus juice, wherein the pulp/juice slurry is aseptic, wherein the pulp/juice slurry has a pectin methylesterase activity of not more than about 1.0 P.E.U., wherein at least about 90% by weight of the sensible pulp consists of broken juice sacs, wherein the citrus is selected from the group consisting of oranges and grapefruits, and wherein the orange sensible pulp has an average size of at least about 2.2 millimeters and the grapefruit sensible pulp has an average size of at least about 3.6 millimeters.

12. A pulp/juice slurry product according to claim 11 which comprises from about 40% to about 50% by weight citrus sensible pulp and from about 50% to about 60% by weight citrus juice.

13. An aseptic citrus sensible pulp product comprising from about 80% to 100% by weight citrus sensible pulp and up to about 20% by weight citrus juice, wherein the sensible pulp is aseptic, wherein the sensible pulp has a pectin methylesterase activity of not more than about 1.0 P.E.U., wherein at least about 90% by weight of the sensible pulp consist of broken juice sacs, wherein the citrus is selected from the group consisting of oranges and grapefruits, and wherein the orange sensible pulp has an average size of at least about 2.2 millimeters and the grapefruit sensible pulp has an average size of at least about 3.6 millimeters.

14. An aseptic citrus sensible pulp product according to claim 13 which comprises from about 90% to 100% by weight citrus sensible pulp and up to about 10% by weight citrus juice.

15. A citrus product according to either claims 11 or 13 wherein the citrus fruit or oranges, and wherein the sensible pulp has an average size of at least about 2.2 millimeters.

16. A citrus product according to claim 15 wherein the sensible pulp has an average size between about 2.2 and about 3.2 millimeters.

17. An improves single-strength citrus juice product comprising:
(a) from about 93% to about 97.5% by weight citrus juice which has a viscosity of not more than about 5.5 centipoise when measured at 8° C. (46.4° F.) and at 11.8° Brix; and
(b) from about 2.5% to about 7% by weight aseptic citrus sensible pulp comprising from about 80% to 100% by weight citrus sensible pulp and up to about 20% by weight citrus juice, wherein the sensible pulp is aseptic, wherein the sensible pulp has a pectin methylesterase activity of not more than about 1.0 P.E.U., wherein at least about 90% by weight of the sensible pulp consists of broken juice sacs, wherein the citrus is selected from the group consisting of oranges and grapefruits, and wherein the orange sensible pulp has an average size of at least about 2.2 millimeters and the grapefruit sensible pulp has an average size of at least about 3.6 millimeters.

18. A single-strength citrus juice according to claim 17 wherein the citrus juice is orange juice.

19. A single-strength citrus juice according to claim 18 which contains added citrus flavorants to obtain a finished product with a titratable peel oil level of less than about 0.015% by volume as consumed; and a volume ratio of the combined amount of acetaldehyde, ethyl butyrate, ethyl 3-hydroxyhexanoate, octanal and valencene, to the combined amount of the alpha-pinene, myrcene, linalool, 4-terpineol, alpha-terpineol and nootkatone of at least 1.2 to 1.

20. An improved single-strength citrus beverage comprising:
(a) from about 93% to about 97.5% by weight of a composition comprising citrus juice, water and sugar, where the composition has a viscosity of not more than about 5.5 centipoise when measured at 8° C. (46.4° F.) and at 11.8° Brix; and
(b) from about 2.5% to about 7% by weight aseptic citrus sensible pulp comprising from about 80% to 100% by weight citrus sensible pulp and up to about 20% by weight citrus juice, wherein the sensible pulp is aseptic, wherein the sensible pulp has a pectin methylesterase activity of not more than about 1.0 P.E.U., wherein at least about 90% by weight of the sensible pulp consists of broken juice sacs, wherein the citrus is selected from the group consisting of oranges and grapefruits, and wherein the orange sensible pulp has an average size of at least about 2.2 millimeters and the grapefruit sensible pulp has an average size of at least about 3.6 millimeters.

* * * * *